A. POUCHAIN.
NEGATIVE PLATE FOR ELECTRIC ACCUMULATORS.
APPLICATION FILED SEPT. 18, 1919.

1,399,995.

Patented Dec. 13, 1921.

INVENTOR.
Adolfo Pouchain.

By Laurence Langner

ATTORNEY.

UNITED STATES PATENT OFFICE.

ADOLFO POUCHAIN, OF TURIN, ITALY.

NEGATIVE PLATE FOR ELECTRIC ACCUMULATORS.

1,399,995.  Specification of Letters Patent.  Patented Dec. 13, 1921.

Application filed September 18, 1919. Serial No. 324,658.

*To all whom it may concern:*

Be it known that I, ADOLFO POUCHAIN, a subject of the King of Italy, and resident of Turin, Italy, have invented a certain new and useful Negative Plate for Electric Accumulators, of which the following is a specification.

It is known that negative plates or electrodes of zinc for accumulators as hitherto made are subject to the defect that they become perforated when the battery has been repeatedly discharged at high intensity, in the course of which the zinc is corroded over its surface in a manner which is not uniform, while the deposition of the zinc during the succeeding re-charging is uniform.

It has been attempted to avoid this defect by forming the negative plate with aid of a supporting plate, either of metal or non-conducting material on which a layer of zinc is deposited. However such procedure has not proved satisfactory because if the supporting plate is of metal the electrolyte can obtain access to it and corrode it in the course of the discharge, and if the supporting plate is of a non-conducting material deposition cannot occur during charging at those places which have been uncovered in consequence of irregular consumption of the layer of zinc, so that there will be discontinuity corresponding with the perforations of the zinc plates.

The object of the present invention is to avoid the perforation of the negative plate so that it may be recharged indefinitely. For this purpose there is used as a support a plate of a material which is a good conductor but non-metallic, for example compressed retort carbon.

Figure 1:
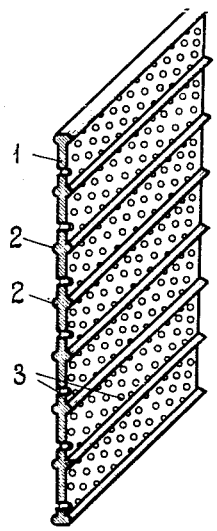
Figure 2:
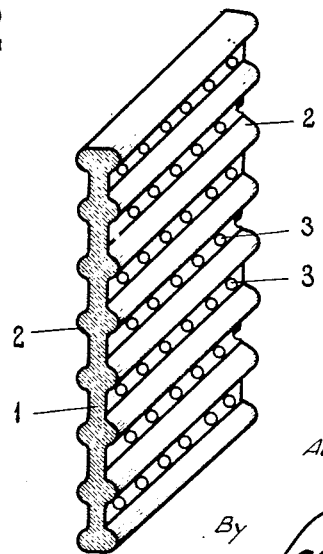

The form of the supporting plate may be any that is desirable such as square or other rectangular shape, and it is preferably made with ribs so as to increase its surface and with small perforations. The accompanying drawing shows by way of example one embodiment of this invention, Figure 1 thereof being a perspective view of a plate made in accordance with the invention, and Fig. 2 a similar view on an enlarged scale. As shown in said figures, the plate 1 has on both its faces ribs 2 of a more or less extended character and is pierced as at 3.

To prepare the negative electrode the supporting plate is placed in a bath containing 5 parts of zinc sulfate, 1 part of mercuric sulfate and 1 part of magnesium sulfate and current is passed therethrough, the support being used as a cathode.

This treatment first covers the supporting plate with a very thin skin of mercury with magnesium, and then the zinc is deposited in a granular state.

When the zinc deposit is about a millimeter thick the electrode is ready for use.

Instead of subjecting the supporting plate directly to the treatment in the aforesaid bath, it may be first covered with a very thin layer of copper, such as by electro-deposition.

Negative electrodes for accumulators according to this invention may be used for a long time even if the discharge is under excessive conditions and even if there is localized wear of the zinc, for in all cases the supporting plate is not corroded so that during the charging period there is always a deposition of a uniform layer of zinc.

What I claim as my invention and desire to secure by United States Letters Patent is:

1. A negative electrode for electric accumulators, comprising a core of non-metallic conducting material coated with a metallic layer of zinc associated with mercury.

2. A negative electrode for electric accumulators, comprising a core of non-metallic conducting material covered with a very thin layer of copper, said copper layer having a coating of zinc and mercury deposited thereon.

3. A negative electrode for electric accumulators, comprising a core of retort carbon coated with a metallic layer composed of zinc associated with mercury.

Signed at Turin, Italy, this 21st day of August, A. D. 1919.

ADOLFO POUCHAIN.